Figure 1:
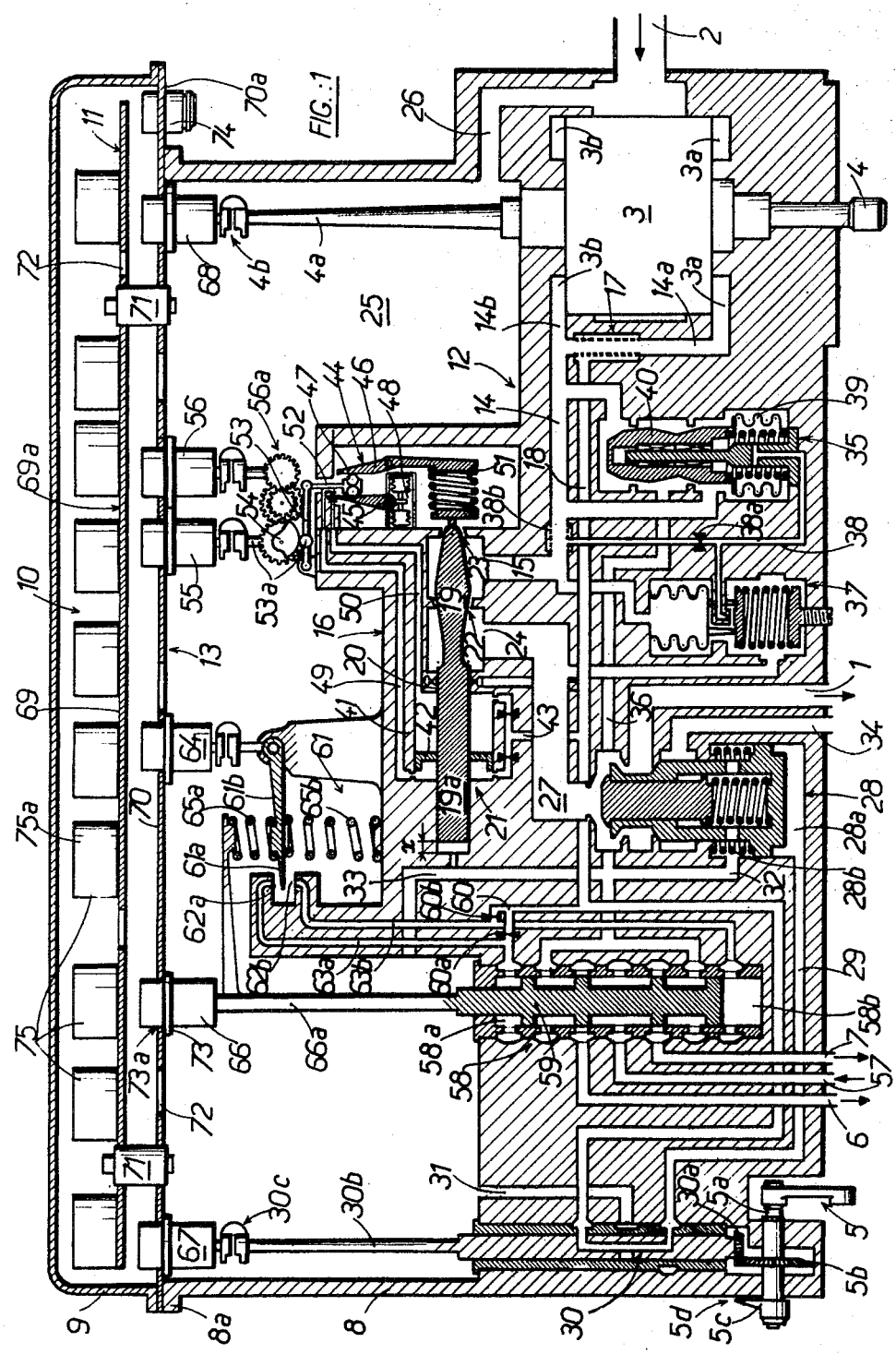

United States Patent [19]

Grunert

[11] 3,842,594

[45] Oct. 22, 1974

[54] GOVERNORS FOR GAS TURBINES

[75] Inventor: Wilhelm Grunert, Dammarie-Les-Lys, France

[73] Assignee: Societe Nationale d'Etude et de Construction de Moteurs d'Aviation, Paris, France

[22] Filed: Apr. 18, 1973

[21] Appl. No.: 352,288

[30] Foreign Application Priority Data
Apr. 19, 1972 France .............................. 72.13746

[52] U.S. Cl. .............................. 60/39.28 R, 60/243
[51] Int. Cl. ............................ F02c 9/08, F02c 9/10
[58] Field of Search ............ 60/39.28 R, 39.31, 243, 60/241

Primary Examiner—Clarence R. Gordon
Attorney, Agent, or Firm—William J. Daniel

[57] ABSTRACT

A governor for controlling the fuel feed of a gas turbine and in particular an aviation turbojet engine, comprising a housing containing hydromechanical elements, electromechanical elements and electronic elements immersed in a fuel bath which is renewed by a circulation of fuel between leakage or return flows caused by the operation of the said hydromechanical elements and a fuel return conduit, the said electronic elements being housed in a removable cover of the housing and fixed to the upper part of a support, the lower part of which supports the electromechanical elements.

7 Claims, 2 Drawing Figures

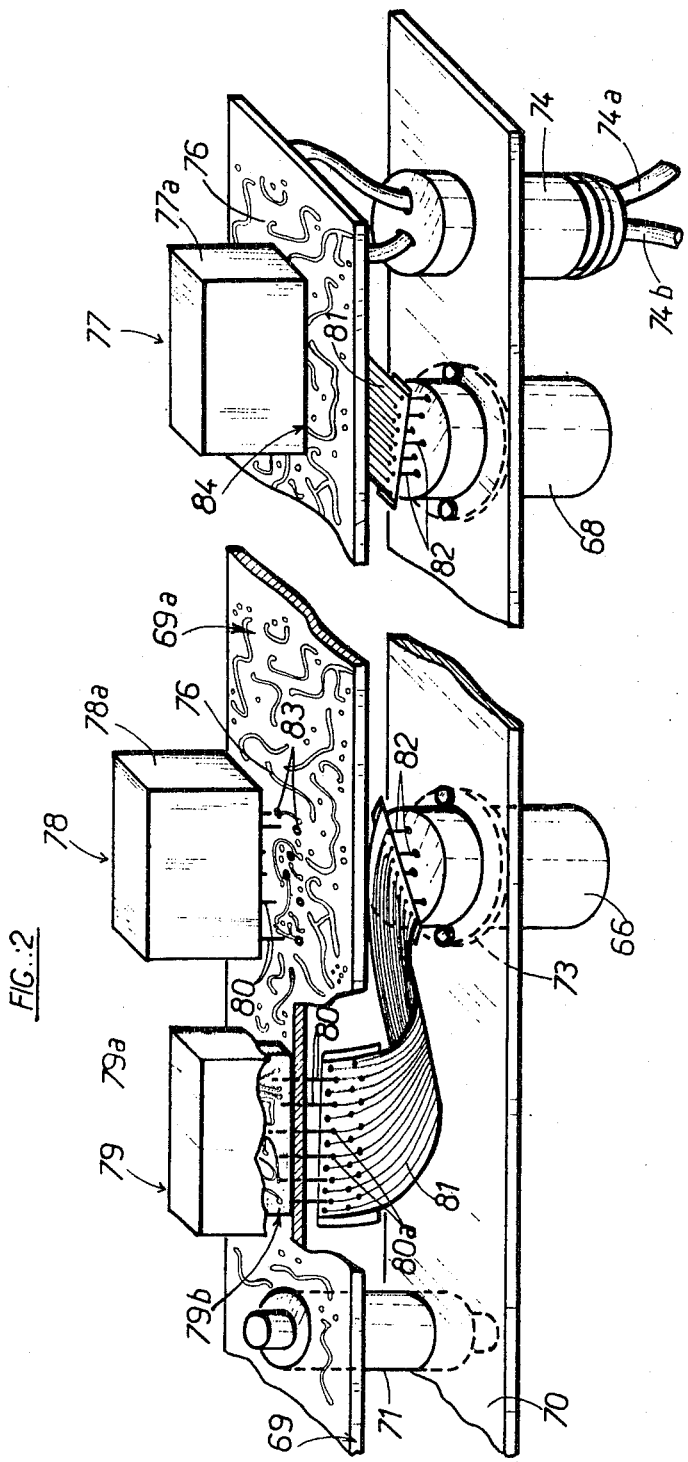

GOVERNORS FOR GAS TURBINES

This invention relates to gas turbines and in particular to aviation turbojet engines. The invention is concerned more precisely with the arrangement and structure of a governor ensuring regulation of the fuel feed of such a turbine engine as a function of various parameters.

In an aviation turbojet engine, for example, some parts of the governor, such as those controlling the injection of the fuel, are almost necessarily hydromechanical, that is to say they comprise mechanical members actuated by hydraulic pressures. Other parts or elements, such as those controlling the nozzle cross-section, are often also hydromechanical. However, while some operating or safety parameters of the aircraft can easily be detected hydraulically, pneumatically or mechanically, many other parameters are more easily measurable and exploitable by electrical or electronic means; this is the case in particular with temperatures, which can be measured by thermocouples, and with speeds of rotation, which can be measured electrically in the form of frequencies, etc.

Electric signals moreover offer the advantage that they can easily be compared with utilization instructions and thus supply very precise error signals. It is easy to construct very high gain amplifiers, introduce counter-reactions, modify phase displacement, effect derivations and integrations with as much ease, and use timing procedures. The technique of electronic computers permits the development of governing or regulating systems which would be unrealizable by mechanical means. Taking account of the recent progress made by electronic cicuits in respect of dependability and miniaturisation, and due to the integrated circuit technique, it is possible to produce an incorporate in the governor certain electromechanical and electronic elements, in particular very large gain amplifiers, which are reliable and stable and of small overall dimensions. Such amplifiers, however, must be carried into effect and checked on a bench, in laboratories, far from all pollution, and adjustment on an aircraft can be poorly imagined. For this reason such components have been presented heretofore in a casing with standardized outlets in the form of multiple-pin sockets which permit their interchangeability and rapid connections with the following stages at one and the same time.

However, the need for frequent removals entails a risk of damage at the level of the pins of the connectors and greatly reduces the reliability of the assembly. It is moreover necessary to ensure cooling of the electromechanical and electronic elements.

The hydromechanical elements of the governor comprise jacks, pumps, metering elements, valves, etc. and their hydraulic circuits. These various elements must be tested on benches comprising fluid circuits identical to the real circuits, and they must also be capable of being adapted and adjusted sometimes on the aircraft (adjustment of inclination and level, for example).

The operation of these hydromechanical elements involves in known manner fuel leakage or return flows, which are generally collected in a return header or collector terminating upstream of the pump feeding the injectors with fuel through the medium of the governor.

The present invention aims to provide an arrangement ensuring the cooling of the electromechanical and electronic elements in a very simple manner with the aid of these leakage or return flows and enabling the drawbacks hereinbefore mentioned to be eliminated.

According to the invention, the electromechanical and electronic elements are contained in a housing also containing the hydromechanical elements and receiving their leakage or return flows, which form therein a fuel bath in which the said electromechanical or electronic elements are immersed, these being cooled by the bath which is renewed by circulation of fuel created between the leakage or return flows and a return conduit integrated in the housing and terminating upstream of the pump.

According to one embodiment of the invention, the electronic elements are housed in a removable cover of the housing and fixed to the upper face of a support (constituted with advantage by a board or assembly of boards) the lower part of which supports the electromechanical elements connected to the said electronic elements by printed circuits forming part of the said support.

The electronic elements are preferably constituted by cartridges connected to the printed circuits, and the hydromechanical elements are advantageously each constituted by an independent device joined by hydraulic connections to the other hydromechanical elements. The governor can thus be produced in modular form, that is to say it can be composed of modules (cartridges, hydromechanical devices and electromechanical elements) which are easily removable, thus enabling it to be repaired, in the event of failure of the governor, by taking action solely on the defective module, which can then be adjusted on the bench or replaced by a sound module.

The invention will now be further described, by way of example, with reference to the accompanying drawings, in which:

FIG. 1 is a diagrammatic sectional view of a governor for an aviation turbojet engine; and FIG. 2 is a partial perspective view illustrating a method of effecting the mounting of the electromechanical elements and the electronic elements on a support.

Reference will first be made to FIG. 1 of the drawings which shows a governor designed to regulate the rate of feed of a conduit 1 connected to the injectors (not shown) of the combustion chamber of the jet engine with fuel taken at 2 by a fuel pump 3, the shaft 4 of which is driven by the jet engine. The governor is controlled by a lever 5 and also serves to control the pressures of fluid supplied to two conduits 6, 7 leading to jacks (not shown) controlling the opening of the propelling nozzle of the turbojet engine.

The governor is contained in a housing 8 provided with a removable cover 9 and essentially comprises an electronic computer 10 made of elements which are fixed to the upper face of a support 11 which is itself fixed to the housing 8, hydromechanical elements 12 located in the lower part of the housing, and electromechanical elements 13 fixed to the lower face of the support 11 and connected electrically to the computer 10 and mechanically to the hydromechanical elements 12.

Polluted fuel, that is to say fuel containing or in danger of containing solid impurities such as sand or metal particles, is taken in at 2 by the fuel pump 3, which is of the vane type and the operation of which is therefore not in danger of being impeded by the impurities, and the pump forces the fuel through inlets 3a, 3b into two conduits 14a, 14b opening into a duct 14 leading to the inlet 15 of a flow metering device 16. The delivery conduit 14a includes a section in which the wall is constituted by a porous sleeve enclosed in a chamber forming with the sleeve a filter 17. A conduit 18 leads from the chamber, which conduit thus receives filtered fuel drawn from the conduit 14a through the sleeve of the filter 17 and which supplies devices which will be described hereinafter. These devices consume a very small flow of fuel; moreover, there is no risk of the filter sleeve becoming clogged, since its inlet surface is permanently washed by the fuel flowing at a high rate through the conduit 14a, so that the loss of pressure of the fuel on passing through the filter is negligible and the pressure prevailing in the conduit 18 is practically speaking equal to the pressure in the duct 14.

The flow metering device 16 comprises a needle 19 provided with a cylindrical stem 19a sliding in a bore 20 under the action of a control device to be described hereinafter, in such manner as to modify in opposite senses the flow cross-sections of two orifices 22 and 23 respectively providing communication between the inlet 15 of the metering device and its outlet 24 and the internal space 25 of the housing 8, which is in communication with a fuel return duct upstream of the pump 3 and shown diagrammatically at 26. The outlet 24 of the metering device opens into a conduit 27 which can be placed in communication with the conduit 1 to feed the injectors by a valve device 28 actuated by the pressure of a control chamber 28a connected by a conduit 29 to a three-way cock 30 actuated by the lever 5 and which causes it to communicate either with the conduit 18 (containing the fuel at the delivery pressure of the pump 3), or with a conduit 31 opening into the space 25 (and consequently containing fuel at the return pressure). The pressure of the control chamber 28a acts against the combined effects of a spring and the pressure of an inner chamber 28b connected to the space 25 by conduits 32 and 33, to open or close the valve device 28. The closing of this device places the conduit 1 in communication with a drain conduit 34.

The duct 14 supplying the metering device 16 from the pump 3 is moreover connected by a regulating valve 35 to a conduit 36 communicating with the return conduit 33 opening into the internal space 25 of the housing 8. In accordance with a well-known principle, this regulating valve opens up communication to a greater or lesser degree between the duct 14 and the conduit 36 so as to maintain the difference in pressure $\Delta p$ between the inlet 15 and the outlet 24 of the metering device 16 at a constant value. To this end, a differential-pressure detector 37 modulates as a function of $\Delta p$ the fuel pressure downstream of a constriction 38a in a conduit 38 drawing fuel from the duct 14 through a filter 38b similar to the filter 17, and the modulated pressure is applied to a bellows 39 to control the position of the needle 40 forming the flow regulating member of the regulating valve 35.

The valve device 28 is open on the starting up of the jet engine and is closed only on stopping; it remains open throughout the period of operation and the metering device 16 regulates the flow of fuel which is supplied to the injectors (not shown) through the conduits 27 and 1. The operative or active part of the needle 19 comprises two surface portions inclined in opposite directions and having approximately the form of two truncated cones joined at their large bases which respectively adjust the flow cross-sections of the annular orifice 22 giving passage to the metered flow C and of the annular orifice 23 through which the surplus flow entering the metering device at 15 is discharged into the internal space 25 of the housing and thence into the return conduit 26. The loss of pressure $\Delta p$ suffered by the fuel on passing through the annular metering orifice 22 being maintained constant by the regulating valve 35, the flow C passing through this orifice 22 is a function only of the flow cross-section thereof and it is known that it is possible to give the surface of the needle 19 a form such that the flow C is directly proportional to a distance $x$ measuring the position of the needle 19. In the following, it will be accepted that this condition is realized in the embodiment illustrated.

The control device 21 of the flow metering device comprises a cylinder 41 in which slides a piston 42 fast with the stem 19a of the needle 19. A branch 43 of the filtered-fuel conduit 18 is divided into two branches respectively feeding, through constrictions, the two chambers of the cylinder separated by the piston 42. The pressures in these two chambers are modulated, as a function of the various regulating parameters of the jet engine, by a leakage device called a force balance which is indicated generally by the reference numeral 44.

This device 44 comprises two levers 45, 46 which grip a pair of rollers 47 between them. The first lever 45 is urged by a bellows device 48 arranged so as to apply thereto a force proportional to a pressure $P_{s4}$, which is the outlet pressure of the high-pressure compressor (not shown) of the jet engine. The end of this first lever 45 forms a blade or tongue which moves between two opposed nozzles connected by conduits 49 and 50, respectively, to the two chambers of the cylinder 41. The piston 42 of the metering device thus acts as a servo piston controlled by the pressures of these two chambers modulated by the nozzles and the tongue, the second lever 46 being connected to the needle 19 of the metering device by a spring 51 to form a return loop.

Thus, to any position of the double roller 47 there corresponds a given value of the ratio $x/P_{s4}$ and, consequently, a given value of the ratio $C/P_{s4}$. The double roller 47 is supported by a rod 52 which extends in the general direction of the levers 45 and 46 and which is articulated to the end of a control lever 53 provided with a roller 53a actuated by a cam 54, the position of which is adjusted by a motor 55 forming part of the electromechanical means 13 and which is itself controlled by the electronic computer 10 as a function of various parameters. A pickup 56 coupled mechanically to the cam 54 by gears 56a introduces the position of the cam in feedback into the motor 55.

The flow of fuel C supplied by the metering device 16 to the conduit 27, and therefore to the injectors (not shown), is thus a predetermined function of $P_{s4}$ and of the other parameters introduced into the regulating or governing process by the computer 10.

The fluid controlling the nozzle jacks (not shown) is fuel delivered at high pressure by a pump (not shown) into a conduit 57 leading to a slide-valve distributor 58 which places this conduit 57 in communication selectively with the conduit 6 or 7 supplying the jacks. The slide valve 59 of this distributor is actuated by the pressures prevailing in two chambers 58a, 58b respectively connected by two constrictions 60a, 60b to a branch 60 of the conduit 18. The pressures in these two chambers, downstream of these constrictions, are modulated by a leakage control device 61 comprising a tongue or blade 61a which moves between two opposed nozzles 62a, 62b respectively connected by conduits 63a and 63b to these two chambers 58a, 58b. The tongue 61a forms the end of a lever 61b to which a rotational torque, which is a function of various parameters, is applied by an electromechanical element 64, called a torque motor, controlled electrically by the computer 10, an opposing torque being applied by springs 65a, 65b as a function of the position of the slide valve 59. The instantaneous position of this slide valve 59 is transmitted to the computer 10 by a capacitive potentiometer 66 connected mechanically to the slide valve by a rod 66a. This potentiometer 66, which forms part of the electromechanical elements 13, ensures the electrical closing or looping of the system.

The throttle lever 5 is keyed on a shaft 5a carrying a bevel gear 5b and a position pointer 5c which moves in front of a graduated scale marked out at 5d on the side of the housing 8. The bevel gear 5b meshes with another bevel gear 30a which drives the plug of the three-way cock 30 hereinbefore mentioned. This plug is integral with a shaft 30b connected by a removable coupling 30c to an inductive potentiometer 67 which forms part of the electromechanical elements 13. This inductive potentiometer introduces the position of the lever 5 (parameter α or lever angle) into the computer.

An extension 4a of the driving shaft 4 of the pump 3 is connected by a removable coupling 4b to an electromechanical element 68, called an acoustic wheel, the function of which is to introduce into the computer 10, in the form of an electric voltage frequency, the speed or rotation of the pump 3 which is proportional to the working conditions of the turbojet engine, the driving of the pump from the latter being effected by gearing.

The hydromechanical elements 12 (the pump 3, metering device 16 with its control device 21 and its force balance 44, the valve device 28, regulating valve 35, differential-pressure detector 37, distributor 58 with its control device 61 and the cock 30 controlled by the lever 5) are shown diagrammatically in FIG. 1. It is expedient to remark, however, that each of them is an independent device connected by conduits to other hydromechanical elements, some of them being connected mechanically to an electromechanical element 13. It will therefore be understood that it is possible to produce these hydromechanical elements in the form of removable modules fixed in the housing 8 by any suitable means, interconnected by removable pipes and connected to the electromechanical elements 13 by couplings which are likewise removable. It is also appropriate to remark that the hydromechanical elements mounted in this way in the housing are immersed in the fuel and that consequently the return conduits such as 31, 32, 33 and 36 can be omitted. The internal space 25 of the housing 8 will be constantly supplied with fuel by the systematic leakages or escapes occurring principally through the annular orifice 23 of the metering device and through the regulating valve 35, and, at a lower rate, in the devices 44 and 61. Other supplies of fuel to the space 25 are made occasionally on operation of the valve device 28 and of the distributor 58. As the housing 8 is connected to the return side by the duct 26, the fuel will be constantly renewed in the space 25 and will therefore cool efficiently the electromechanical elements 13 and the electronic elements 10 which are immersed in this fuel.

The support 11 is shown diagrammatically in the form of two boards 69, 70 joined together by hollow spacers 71 which can afford passage to electric conductors (not shown), the lower board 70 being fixed removably, by any suitable means, to a rim 8a surrounding the opening at the top of the housing 8 and extending beyond this rim on one side at 70a. The cover 9 is fixed removably by any suitable means to the periphery of the board 70 and the two boards 69, 70 have apertures such as 72 enabling the fuel to fill all the internal space 25 of the housing and to circulate freely therein towards the return duct 26. The electromechanical elements 55, 56, 64, 66, 67 and 68 are provided with collars or flanges such as 73 enabling them to be fixed in openings such as 73a provided for this purpose in the board 70, and with connectors (not shown) which connect these elements to electric conductors (which are not shown either) leading to a connecting device 74 fixed to the outer portion 70a of this board and intended to be connected to an electric current supply and to various temperature pickups (not shown) supplying the parameters of the regulation process. This connecting device 74 is also connected by piping (not shown) to the capsules 48 and permits connection of this piping to an intake (not shown) for the pressure $P_{s4}$.

The computer 10 is entirely electronic and transistorised. It is composed of various miniaturised modules 75 protected by fluid-tight casings 75a provided at the bottom with pins designed to secure the fixing thereof to the support 11 by being engaged vertically in the downward direction in seats or sockets provided for this purpose in the board 69. The modules 75 are thus plugged into the upper face 69a of this board 69, which is formed by an assembly of printed circuits which ensure the connection of contacts (not shown) located on the bottom part of the modules 75 with one another and with the conductors extending through the spacers 71. The parameters used in the regulation or governing system and the wiring scheme of the latter do not form part of the invention any more than the electronic scheme or arrangement of the computer 10. For this reason, it does not seem necessary to describe them in detail. In the embodiment illustrated, the parameters comprise the lever angle α introduced into the regulation system by the inductive potentiometer 67, the working conditions or rate N of the jet engine introduced by the acoustic wheel 68, the outlet pressure $P_{s4}$ of the high-pressure compressor introduced by the capsules 48, the nozzle opening introduced by the capacitive potentiometer 66, and may also comprise other parameters, for example temperatures, introduced in the form of electric signals through the connecting device 74. The modules 75 of the computer may comprise function generators, amplifiers and correcting networks, and various adjusting elements such as trimmers and test connections may be incorporated in the support 11.

The modules 75 of the computer 10 and the electromechanical elements 13 are immersed in the constantly renewed fuel filling the housing 8 and are thus cooled efficiently. The modules 75, which are electronic devices and consequently require the most frequent checks, are most easily accessible and removable; it is sufficient for this purpose to remove the cover 9 and disengage the pins ensuring the fixing thereof to the board 69. To remove the electromechanical elements 13, it is moreover necessary to undo the fixings of the board 70 to the rim 8a of the housing and lift the support 11; the elements 13 come with it, since their mechanical connections with the hydromechanical elements comprise removable couplings such as 4b and 30c, with the exception of the element 66, which is a capacitive potentiometer without any mechanical connection with the rod 66a, this merely extending into a cavity of this element. The collars 73 of those elements it is desired to check, adjust on the bench, or replace can then be detached from the board 70. The removal of the support 11 also gives access to the hydromechanical elements 12, which can likewise be removed individually from the housing 8 for the purpose of checking, adjustment or replacement.

The electrical connections are not shown in FIG. 1, but there can be seen in FIG. 2 supply cables 74a, 74b extending through the connecting device 74 and leading to printed circuits (not visible) on the lower face of the board 69 which are themselves connected electrically through this board 69 to printed circuits 76. In FIG. 2 there are shown by way of example three electronic elements 77, 78, 79. The casing 79a of the element 79 is shown broken away to make it possible to see an electronic module 79b the electronic components of which are connected by pins 80, soldered at 80a, to a flexible printed circuit tape 81, which is itself connected by connectors 82 to the electromechanical element 66. The electronic element 78 is shown unplugged; in this element, the module is hidden by the casing 78a and the pins 80 are disengaged from the sockets 83 of the board 69, which enables a printed circuit 76 to be seen. The element 77 is shown in position, its casing 77a being fixed by a fluid-tight weld at 84 to the board 69.

I claim:

1. A governor for controlling the fuel feed of a gas turbine and in particular an aviation turbojet engine, comprising a housing having a removable cover and containing a fuel bath; hydromechanical elements contained in the housing and immersed in said fuel bath, said hydromechanical elements having fuel return and leakage orifices opening into the said housing; a pumping device for feeding said hydromechanical elements with fuel; a return conduit for fuel leaving said housing; a support arranged in the housing and defining a space contained in the cover, said support having an upper part and a lower part; electromechanical elements contained in the housing and supported by the lower part of said support in such manner as to be immersed in the fuel bath; mechanical connections connecting said hydromechanical elements to said electromechanical elements; electronic elements supported by the upper part of said support in the said space in such manner as to be immersed in the fuel bath; and electrical connections connecting the electromechanical elements to the electronic elements.

2. A governor as claimed in claim 1, in which said electrical connections comprise printed circuits which form part of the support.

3. A governor as claimed in claim 1, in which the support comprises a board fixed between said cover and a rim surrounding an opening at the top of the housing.

4. A governor as claimed in claim 1, in which the mechanical connections comprise removable couplings.

5. A governor as claimed in claim 1, in which the electronic elements comprise modules protected by fluid-tight casing.

6. A governor as claimed in claim 5, comprising means for plugging said modules into said support, and electrical connections on the fluid-tight casings for directly securing continuity of the electrical connections.

7. A governor as claimed in claim 6, in which said hydromechanical elements comprise a plurality of independent devices and hydraulic connections between said independent devices.

* * * * *